United States Patent [19]

Danner et al.

[11] 3,980,682

[45] Sept. 14, 1976

[54] AMINO-CONTAINING POLYMERS

[75] Inventors: Bernard Danner, Riedisheim, France; Richard Hochreuter, Oberwil, Switzerland

[73] Assignee: Sandoz Ltd., Basel, Switzerland

[22] Filed: Apr. 1, 1974

[21] Appl. No.: 456,977

[30] Foreign Application Priority Data

Apr. 3, 1973 Switzerland.......................... 4740/73

[52] U.S. Cl............................ 260/404.5; 260/309.6; 252/8.8; 526/11.2; 526/14; 526/49
[51] Int. Cl.²........................ C08F 8/06; C08F 8/32
[58] Field of Search................ 260/404.5, 94.9 GD, 260/94.9 GB, 94.9 GC

[56] References Cited

UNITED STATES PATENTS

| | | | |
|---|---|---|---|
| 3,012,964 | 12/1961 | Pollitzer...................... | 260/404.5 X |
| 3,038,815 | 6/1962 | Kaupp et al. ................ | 260/404.5 X |
| 3,756,999 | 9/1973 | Stetter et al................. | 260/94.9 GC |
| 3,779,963 | 12/1973 | Ancker et al. .............. | 260/94.9 GD |
| 3,843,391 | 10/1974 | Toepfl et al. ................ | 260/404.5 X |

*Primary Examiner*—Patrick P. Garvin
*Attorney, Agent, or Firm*—Gerald D. Sharkin; Richard E. Vila; Joseph J. Borovian

[57] ABSTRACT

The invention relates to synthetic polymers obtainable by condensing a. a carboxyl-group-bearing polymer having a molecular weight of between 300 and 10,000,
b. a primary aliphatic amine containing 1 to 6, preferably 1 to 3, particularly 1, hydroxyl group,
c. an epihalohydrin, and
d. an alkyl($C_{11}$–$C_{22}$) or alkenyl($C_{11}$–$C_{22}$) group-containing mono or poly amine, unsubstituted or substituted on the alkyl or alkenyl chain by hydroxyl and/or substituted on the amino function(s) by alkyl($C_1$–$C_3$), unsubstituted or substituted by hydroxyl and/or a group $(-CH(Ro)-CH_2-O)_r-H$ or $(-CH_2-CH(Ro)-O)-O)_r-H$ wherein Ro is hydrogen, methyl or ethyl, and $r$ is an integer 2 to 30, that are water dispersible and in disperse form are useful as wash softeners for synthetic fibers especially polyamide fibers.

28 Claims, No Drawings

AMINO-CONTAINING POLYMERS

The present invention relates to polymers, specifically to amino-containing-polymers that are water dispersible and in dispersed form are useful as wash-proof softeners for synthetic fibres, especially polyamide fibres.

Accordingly, the present invention provides a synthetic polymer obtainable, or obtained, by a process which comprises condensing a. a carboxyl-group-bearing polymer having a molecular weight of between 300 and 10,000, b. a primary aliphatic amine containing 1 to 6, preferably 1 to 3, particularly 1, hydroxyl group, c. an epihalohydrin, and d. an alkyl ($C_{11}$–$C_{22}$) or alkenyl ($C_{11}$–$C_{22}$) group containing mono or poly amine, unsubstituted or substituted on the alkyl or alkenyl chain by hydroxyl and/or substituted on the amino function(s) by alkyl ($C_1$–$C_3$), unsubstituted or substituted by hydroxyl and/or a group

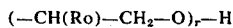

wherein Ro is hydrogen, methyl or ethyl, and $r$ is an integer 2 to 30.

The resulting compounds may exist and be employed in either free base, acid addition salt or quaternary ammonium salt form. Free base forms may be converted to acid addition salt or quaternary ammonium salt forms in manner known per se and vice versa.

When any of the reactants (a), (b), (c) or (d) contain an alkyl or alkenyl group, this may be straight or branched chain unless otherwise indicated.

Oxidised polyethylene is a suitable polymer (a) containing carboxyl groups. This is produced by a known method from polyethylene (which may be produced by the known high or low pressure polymerization method) by means of oxidation, e.g. with atmospheric oxygen. The molecular weight is generally between approximately 700 and 7000, preferably between 1500 and 6000 and particularly between 1500 and 4000. The acid value is, in general, in the range of 10 to 120, preferably 15 to 80. With a molecular weight of 700 to 7000, an acid value between 10 and 120 means that the number $p$ of COOH mols per mol polymer is between 0.125 and 15, preferably between 0.191 and 10.

Copolymers of ethylene and an unsaturated aliphatic carboxylic acid, preferably an $\alpha,\beta$ unsaturated carboxylic acid with 3 to 8 carbon atoms, for example acrylic acid, methacrylic acid or ethacrylic acid, may also be employed for the polymer (a) containing carboxyl groups. The molecular weight is, in general, between 1000 and 6000, preferably between 3000 and 5000, and the acid value is, in general, between 20 and 100, preferably between 30 and 80. With a molecular weight of between 1000 and 6000, an acid value between 20 and 100 means that the number $p$ of COOH mols per mol polymer is between 0.357 and 10.74, preferably between 0.535 and 8.58.

In general, the acid value of reactant (a) is between 10 and 100, more preferably between 15 and 100, particularly between 15 and 80, e.g. between 30 and 80.

Suitable straight-chain or branched primary aliphatic amines b) containing hydroxyl groups are $C_1$–$C_8$, particularly $C_1$–$C_5$, e.g. $C_1$–$C_4$, alkyl mono amines containing 1 to 4, particularly 1 or 2 hydroxyl groups, especially 1 hydroxyl group, for example, mono-n- and mono-isopropanol amine, monobutanol amine, monopentanol amine, 2-amino-2-methyl-1-propanol, diglycol amine, tris-(hydroxymethyl)-amino methane and the primary aliphatic amine which is obtained when 1 mol sorbitol is reacted with 1 mol epichlorohydrin and with 2 mols $NH_3$, 1 mol $NH_3$ being used to neutralise the hydrochloric acid which develops. Mono-ethanol amine is preferred.

As epihalohydrin reactant (c) may be used a ($C_3$–$C_6$) epihalohydrin, especially ($C_3$–$C_5$) epihalohydrin, particularly the epichlorohydrins, such as 1,2-epoxy-4-chlorobutane, 2,3-epoxy-4-chlorobutane, 2,3-epoxy-5-chloropentane and especially, 1,2-epoxy-3-chloropropane.

Compounds of the formula

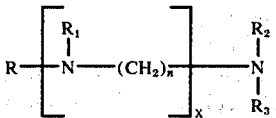

are preferred for the mono- or polyamines (d), wherein

R is alkyl or alkenyl ($C_{12}$ to $C_{22}$) unsubstituted or substituted by hydroxyl, $R_1$, $R_2$ and $R_3$ are each independently hydrogen, or alkyl ($C_1$–$C_3$) unsubstituted or substituted by hydroxyl or by a radical (—CH(Ro—CH$_2$—O)$_r$—H or (—CH$_2$—CH(Ro)—O)$_r$—H wherein Ro and $r$ are as defined above, $n$ is an integer 2 or 3, and $x$ is 0 or an integer 1 to 4.

Particularly preferred in this group are compounds of formula Ia, i.e. compounds of formula I, wherein R is a straight-chain, unsubstituted alkyl radical with 16 to 20 carbon atoms, particularly 18 carbon atoms, $R_1$, $R_2$ and $R_3$ are hydrogen, $n$ is an integer 2 or 3, and $x$ is 0 or an integer 1 to 4.

Also suitable are compounds of formula II,

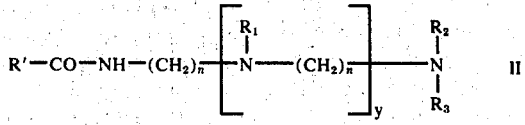

wherein

R' is alkyl or alkenyl ($C_{11}$–$C_{21}$) unsubstituted or substituted by hydroxyl, $R_1$, $R_2$, $R_3$ and $n$ are as defined above, and $y$ is 0 or an integer 1 to 3.

Particularly preferred in this group are compounds of formula IIa, i.e. componds of formula II, wherein R' is a straight-chain, unsubstituted alkyl radical with 15 to 19 carbon atoms, particularly 17 carbon atoms and $R_1$, $R_2$ and $R_3$ are hydrogen, $n$ is an integer 2 or 3 and $y$ is 0 or an integer 1 to 3.

Also suitable are compounds of formula III,

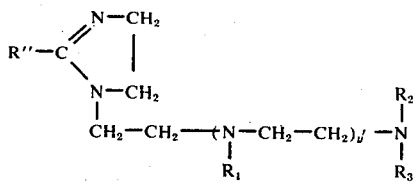

III wherein

R″ is alkyl or alkenyl ($C_{11}$–$C_{21}$) unsubstituted or substituted by hydroxyl, $R_1$, $R_2$, $R_3$ are as defined above and $y'$ is 0 or an integer 1 or 2.

Particularly preferred in this group are compounds of formula IIIa, i.e. compounds of formula III, wherein R″ is a straight-chain, unsubstituted alkyl radical with 15 to 19 carbon atoms, particularly 17 carbon atoms, and $R_1$, $R_2$ and $R_3$ are hydrogen and $y'$ is 0 or an integer 1 or 2.

The most preferred polymers are those formed from monoethanol amine and epichlorohydrin and have a structure in accordance with formula IV

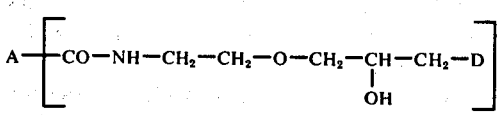

IV wherein

A—CO— is the acyl residue of the carbonyl-containing polymer (a) defined above,

D is the amine residue of the mono or polyamine (d) defined above, and $q$ is a number between 0.125 and 15.

Of the compounds of formulae I, II and III, which may be employed as reactant (d), defined above, mention should be made of the following: fatty amines, such as lauryl amine, myristyl amine, palmityl amine, stearyl amine, oleyl amine, behenyl amine or mixtures of fatty amines, addition products of acrylonitrile with fatty amines with 12 to 22 carbon atoms, whereby the addition product is reduced to the amine; furthermore, reaction products of fatty acids with 12 to 22 carbon atoms and amino ethyl - and amino propyl derivatives, such as ethylene diamine, propylene diamine, diethylene triamine, triethylene tetramine, tetraethylene pentamine, dipropylene triamine, tripropylene tetramine, N-methylimino-bis-propylamine and N,N′-(15)-ethoxy stearyl propylene diamine. Further examples are amines which contain an alkyl radical substituted by a hydroxyl group, e.g. N-2-hydroxyethyl-ethylene diamine, and also the imidazoline derivatives obtained by cyclization of the reaction products of fatty acids and the amino ethyl derivatives mentioned above. Examples of fatty acids that may be employed here are lauric acid ($C_{12}$), myristic acid ($C_{14}$), palmitic acid ($C_{16}$), stearic acid ($C_{18}$), arachic acid ($C_{20}$) and behenic acid ($C_{22}$). Unsaturated fatty acids, e.g. lauroleinic acid ($C_{12}$), palmitoleinic acid ($C_{16}$), oleic acid ($C_{18}$) and ricinoleic acid ($C_{18}$), substituted by a hydroxyl group are also suitable, as are multi-unsaturated fatty acids, e.g. doubly unsaturated linoleic acid ($C_{18}$). Mixtures of fatty acids, e.g. tallow or coconut fatty acid mixtures, may be employed.

Of the imidazoline compounds, special mention should be made of 1-amino-ethyl-2-alk(en)yl-imidazoline with an alkyl or alkenyl radical with 11 to 21 carbon atoms, preferably with an alkyl radical with 15 to 19 carbon atoms, particularly with 17 carbon atoms. The reaction of the polymers (a) containing carboxyl groups with the aliphatic, primary amine (b) containing hydroxyl groups takes place at a temperature of between 100°C and 200°C, preferably between 160°C and 190°C. As a rule, 0.8 to 1.2 mols of the primary basic amine are used per carboxyl group contained in the polymer (a). A solvent or suspension medium which forms an azeotropic mixture with water, such as xylene, may be employed. The two components are, for example, heated together and the water that forms is distilled off. The condensation product obtained is reacted with an epihalohydrin (c). This reaction takes place as a rule at a temperature of between 95°C and 140°C, preferably in the presence of a catalyst, e.g. tin tetrachloride, sulphuric acid, hydrochloric acid or phosphoric acid. The time which addition takes depends on the reaction temperature. The reaction can be carried out without a solvent. The epihalohydrin and the catalyst may be added drop by drop to the molten condensation product and the reaction takes place at the desired temperature. 0.5 to 1.2 mols of an epihalogen hydrin is used per reaction component built up from 1 mol primary, aliphatic amine (b), preferably per mol free hydroxy group in the reaction component. The reactive groups introduced into the intermediate compound are then reacted with an amine (d), e.g. of formula I, II or III. The two components may be melted together and heated until the reaction is shown to be complete by means of chlorine ion titration. If the mono- or polyamine (d) contains only tertiary nitrogen atoms, quaternary ammonium salts are formed. As a rule, 0.8 to 1.2 mols of a compound of formula I, II or III are employed per mol of reactive chlorohydrin group introduced into the reaction component. The reaction temperature is between 100°C and 150°C. The dispersion is, as a rule, prepared by pouring the hot melt of the polymers containing amino groups, at a temperature of approximately 100°C to 140°C, into hot water, with stirring; an emulsifier may be present. If the reaction product has not yet become a salt, the water preferably contains an acid which is suitable for forming an acid addition salt with the polymers containing amino grops. Inorganic acids, such as phosphoric acid, hydrochloric acid or organic acids, such as formic acid, acetic acid, propionic acid, lactic acid and oxalic acid, are suitable for acid addition salt formation. The acid concentration is 1 to 4 equivalents of acid per basic amino group. It is also possible to add the acid to the molten polymers and directly to emulsify the melt by pouring it into water at approximately 95°C to 98°C, with stirring.

The dispersion obtained by directly dispersing the polymeric compounds of the invention in aqueous solution are useful for the washproof, softening treatment of textiles, particularly those made from natural fibres, such as cellulose, regenerated cellulose, natural polyamides and those made from synthetic fibres, such as those containing polyacrylonitrile, polyester, polyamide or polyolefine fibres, as described, for example, in "Einfuhrung in die Chemie und Technologie der Kunststoffe, Akademieverlag, Berlin, 1952". Treatment of the textiles is carried out in the usual manner;

the textile can, for example, be treated with an aqueous solution in concentrations of between 0.1 to 20 g/l from a long liquor or of between 1 and 30 g/l from a short liquor (on a padding machine), the pH being preferably between 3 and 8. The material can then be hydro-extracted or squeezed and dried at 80°C to 160°C. The softening agents according to the invention may also be employed in conjunction with other preparations used for treating textiles, such as high-grade finishing products, e.g. resin-forming N-methylol compounds, e.g. dimethylol urea, dimethylol propylene urea, dimethylol ethylene urea, hydroxy ethylene urea and hydroxy propylene urea.

It is found that the applied softening agent also imparts an antistatic effect to the fibre when applied in the above described manner, i.e. the softening agent reduces the tendency of the fibre to accumulate static electricity.

The following Examples are intended to illustrate, but not limit, the invention.

The parts and percentages are by weight and the temperatures are in degrees Centigrade.

EXAMPLE 1

200 Parts of an oxidized polyethylene with acid value 28, which has been obtained by oxidation of a polyethylene of medium molecular weight of 2000 to 2500, and with a density of 0.93 g/cc and a melting point of 98° to 100° are mixed with 6.1 parts mono-ethanol amine at 170°. Nitrogen is added with stirring and the reaction water that is formed is distilled off. After 3 hours at 170° heating is interrupted, the pressure is reduced to 40 Torr for approximately ½ hour and the reaction mixture cooled to 100°. The acid value of the product is approximately 5.

9.25 Parts epichlorohydrin are then added and, as soon as the mixture is homogeneous, 0.44 parts tin tetrachloride are added. The charge is heated for 6 hours at 95° to 100°, and then 26.9 parts stearyl amine are added and the temperature is increased to 140°. The reaction is allowed to continue at this temperature for approximately 2½ hours.

A dispersion is prepared by melting 15 parts of the above product with 0.5 parts of a mixture of n-alkylene amino propyl amines, 28% of which is a $C_{16}H_{33}$-alkyl radical, 28% a $C_{18}H_{37}$-alkyl radical and 43% a $C_{18}H_{35}$-alkenyl radical. 3 Parts glacial acetic acid are then added with stirring. The mixture is stirred until homogeneous and poured, with vigorous stirring, into 56.5 parts water at approximately 95° – 98°. A fine emulsion then forms which is allowed to cool with stirring. The dispersion obtained can be diluted to the concentration required for use with water. It is suitable for use as a washproof softening agent for synthetic fibres.

EXAMPLE 2

The method is as described above, but instead of 26.9 parts stearyl amine, 27.8 parts of a mixture of n-alkyl amines, the alkyl radicals of which being 42% a $C_{18}H_{37}$ radical, 12% a $C_{20}H_{41}$ radical and 40% a $C_{22}H_{45}$ radical, are employed. A dispersion is prepared by melting 15 parts of the product and adding 7.5 parts glacial acetic acid with stirring. The mixture is stirred until homogeneous and poured, with vigorous stirring, into 52.5 parts water at approximately 95° – 98°. The dispersion obtained is cooled with stirring and may be diluted to the concentration required for use with water. It is suitable for use as a washproof softening agent for synthetic fibres.

EXAMPLE 3

The method is as described in Example 2, but instead of 27.8 parts of the n-alkyl amine mentioned in this Example, 35.1 parts of an alkyl amino propyl amine with the same alkyl radical composition are employed. An aqueous dispersion of the product is prepared as described in Example 2. When applied to synthetic fibres, the product imparts a very soft handle with excellent resistance to washing.

EXAMPLE 4

248 Parts of a copolymer of ethylene and acrylic acid with an acid value of 45, a density of 0.93 g/cm and a melting point of 108° are dissolved in xylene and mixed at 170° with 12.2 parts mono-ethanolamine. The reaction water which is produced is distilled azeotropically. After approximately 3 hours at 170°, the xylene, the residual water and the non-reactive mono-ethanolamine are distilled off under vacuum. The acid value of the product is approximately 25.

The charge is then cooled to 110° and 8.3 parts epichlorohydrin and 0.5 parts tin tetrachloride are added. It is then left to react for 2 hours at 110°, after which 24.2 parts stearyl amine are added and the temperature is increased to 120°. After 2 hours at 120°, the reaction mixture is heated to 140° and left for 1 hour at this temperature.

A dispersion is prepared by melting 15 parts of the above product with 3 parts of the alkylene amino propyl amine mixture mentioned in Example 1 and adding 0.5 parts acetic acid with stirring. The mixture is stirred until homogeneous and 56.5 parts water at 95° – 98° are added carefully with vigorous stirring. The dispersion obtained is stirred until cool.

EXAMPLE 5

The method is as described in Example 1, but instead of 6.1 parts mono-ethanolamine, 7.5 parts 1-amino-2-propanol is used for amidation. The charge is condensed at 170° for 5 hours instead of for 3 hours. The acid value of the product is then approximately 5.

An aqueous dispersion of the product is prepared as described in Example 1, but using the following 15 parts of the above product
1.5 parts of the n-alkylene amino propyl amine mixture according to Example 1
1.5 parts glacial acetic acid
57 parts water

EXAMPLE 6

The method is as described in Example 1, but instead of 26.9 parts stearyl amine, 39.7 parts n-stearoyl dipropylene triamine are used. This is obtained according to known methods by thermal condensation of 1 mol stearic acid with 1 mol dipropylene triamine.

An aqueous dispersion of the product is prepared as described in Example 1, but using the following 15 parts of the above product
3 parts of the n-alkylene amino propyl amine mixture according to Example 1
1.5 parts glacial acetic acid
130.5 parts water

EXAMPLE 7

The method is as described in Example 1, but instead of 26.9 parts stearyl amine, 35.1 parts 1-amino-ethyl-2-stearyl imidazoline prepared by the methods mentioned in the journal "Fette, Seifen, Anstrichmittel", No. 73, page 175 (1971), are used. An aqueous dispersion of the above product is prepared as described in Example 6.

What is claimed is:

1. A synthetic polymer obtained by a process comprising the steps of:
   1. condensing reactant (a), which is a carboxyl group bearing oxidized polyethylene having a molecular weight of between 700 and 7000 and an acid value of between 10 and 120, with reactant (b), which is a primary aliphatic amine containing 1 to 6 hydroxyl groups, at a temperature between 100°C. and 200°C. and in a molar ratio of 0.8 to 1.2 mols of reactant (b) per mol equivalent of carboxyl of reactant (a);
   2. condensing the resulting condensate with reactant (c), which is an epihalohydrin, at a temperature between 95°C. and 140°C. and in a molar ratio of 0.5 to 1.2 mols of reactant (c) per mol equivalent of hydroxyl in the condensate of reactants (a) and (b); and
   3. condensing the condensate of reactants (a), (b), and (c) with reactant (d), which is a compound of the formula I

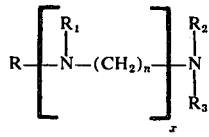

wherein R is $C_{12}$–$C_{22}$alkyl, $C_{12}$–$C_{22}$alkyl substituted by hydroxyl, $C_{12}$–$C_{22}$alkenyl or $C_{12}$–$C_{22}$alkenyl substituted by hydroxyl,
   $R_1$, $R_2$ and $R_3$ are each, independently, hydrogen, $C_1$–$C_3$alkyl, $C_1$–$C_3$alkyl substituted by hydroxyl or a radical of the formula $(CH(R_o)-CH_2-O)_r-H$ or $(CH_2-CH(R_o)-O)_r-H$ wherein $R_o$ is hydrogen, methyl or ethyl and $r$ is an integer 2 to 30,
   $n$ is an integer 2 or 3, and
   $x$ is 0 or an integer 1 to 4, or a compound of formula II

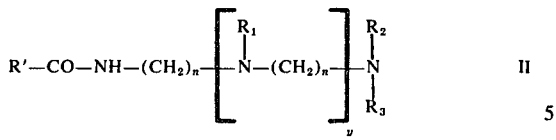

wherein $R'$ is $C_{11}$–$C_{21}$alkyl, $C_{11}$–$C_{21}$alkyl substituted by hydroxyl, $C_{11}$–$C_{21}$alkenyl or $C_{11}$–$C_{21}$alkenyl substituted by hydroxyl,
   $R_1$, $R_2$, $R_3$ and $n$ are as defined above with respect to formula I, and
   $y$ is 0 or an integer 1 to 3, at a temperature between 100°C. and 150°C. and in a molar ratio of 0.8 to 1.2 mols of reactant (d) per mol equivalent of halohydrin in the condensate of reactants (a), (b) and (c).

2. A process for producing a synthetic polymer comprising the steps of:
   1. condensing reactant (a), which is a carboxyl group bearing oxidized polyethylene having a molecular weight of between 700 and 7000 and an acid value of between 10 and 120, with reactant (b), which is a primary aliphatic amine containing 1 to 6 hydroxyl groups, at a temperature between 100°C. and 200°C. and in a molar ratio of 0.8 to 1.2 mols of reactant (b) per mol equivalent of carboxyl of reactant (a);
   2. condensing the resulting condensate with reactant (c), which is an epihalohydrin, at a temperature between 95°C. and 140°C. and in a molar ratio of 0.5 to 1.2 mols of reactant (c) per mol equivalent of hydroxyl in the condensate of reactants (a) and (b); and
   3. condensing the condensate of reactants (a), (b), and (c) with reactant (d), which is a compound of formula I,

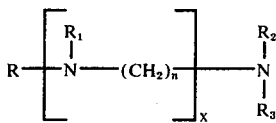

wherein R is $C_{12}$–$C_{22}$alkyl, $C_{12}$–$C_{22}$alkyl substituted by hydroxyl, $C_{12}$–$C_{22}$alkenyl or $C_{12}$–$C_{22}$alkenyl substituted by hydroxyl,
   $R_1$, $R_2$ and $R_3$ are each, independently, hydrogen, $C_1$–$C_3$alkyl, $C_1$–$C_3$alkyl substituted by hydroxyl or a radical of the formula $(CH(R_o)-CH_2-O)_r-H$ or $(CH_2-CH(R_o)-O)_r-H$ wherein $R_o$ is hydrogen, methyl or ethyl and $r$ is an integer 2 to 30,
   $n$ is an integer 2 or 3, and
   $x$ is 0 or an integer 1 to 4, or a compound of formula II,

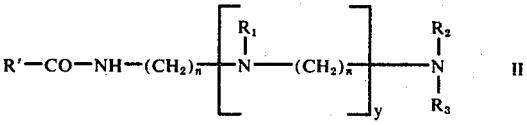

wherein $R'$ is $C_{11}$–$C_{21}$alkyl, $C_{11}$–$C_{21}$alkyl substituted by hydroxyl, $C_{11}$–$C_{21}$alkenyl or $C_{11}$–$C_{21}$alkenyl substituted by hydroxyl,
   $R_1$, $R_2$, $R_3$ and $n$ are as defined above with respect to formula I, and
   $y$ is 0 or an integer 1 to 3, at a temperature between 100°C. and 150°C. and in a molar ratio of 0.8 to 1.2 mols of reactant (d) per mol equivalent of halohydrin in the condensate of reactants (a), (b) and (c).

3. A synthetic polymer according to claim 1 wherein $R'$ of formula II is $C_{15}$–$C_{19}$alkyl.

4. A synthetic polymer according to claim 1 of formula IV,

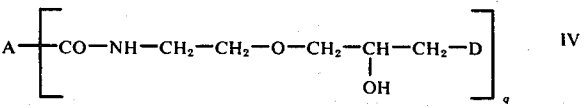

wherein A—CO— is the acyl residue of the carboxyl group bearing oxidized polyethylene reactant (a),
   D is the amine residue of the mono- or polyamine reactant (d), and $q$ is a number between 0.125 and 15.

5. A synthetic polymer according to claim 1 which is obtained by condensing an oxidized polyethylene with monoethanolamine, condensing the resulting condensate with epichlorohydrin, and condensing the condensate of the oxidized polyethylene, monoethanolamine and epichlorohydrin with stearyl amine.

6. A synthetic polymer according to claim 5 wherein the oxidized polyethylene has an acid value of 28 and a molecular weight of between 2000 and 2500.

7. A synthetic polymer according to claim 1 wherein the oxidised polyethylene has a molecular weight of from 1500 to 6000.

8. A synthetic polymer according to claim 7 wherein the synthetic polymer has a molecular weight of from 1500 to 4000.

9. A synthetic polymer according to claim 1, wherein the reactant (a) has an acid value between 10 and 100.

10. A synthetic polymer according to claim 9 wherein reactant (a) has an acid value between 15 and 100.

11. A synthetic polymer according to claim 10 wherein reactant (a) has an acid value between 15 and 80.

12. A synthetic polymer according to claim 11 wherein reactant (a) has an acid value between 30 and 80.

13. A synthetic polymer according to claim 8 wherein reactant (a) has an acid value of between 15 and 80.

14. A synthetic polymer according to claim 1, which is obtained by employing as reactant (b) an hydroxyl-containing alkyl mono-amine.

15. A synthetic polymer according to claim 14 wherein the hydroxyl containing alkyl mono-amine is a $(C_1-C_4)$alkyl mono-amine containing 1 or 2 hydroxyl groups.

16. A synthetic polymer according to claim 15 wherein the $(C_1-C_4)$ alkyl mono-amine is monoethanolamine or 1-amino-2-propanol.

17. A synthetic polymer according to claim 1 wherein reactants (a) and (b) are condensed at a temperature between 160° and 190°C.

18. A synthetic polymer according to claim 1, wherein reactant (c) is a $(C_3-C_6)$ epichlorohydrin.

19. A synthetic polymer according to claim 18 wherein reactant (c) is 1,2epoxy-3-chloropropane.

20. A synthetic polymer according to claim 1, wherein reactant (c) is condensed in the presence of a catalyst.

21. A synthetic polymer according to claim 20 wherein the catalyst is selected from the group consisting of tin tetrachloride, sulphuric acid, hydrochloric acid and phosphoric acid.

22. A synthetic polymer according to claim 1 wherein in formula I, R is alkyl $(C_{16}-C_{20})$.

23. A synthetic polymer according to claim 1, wherein $R_1$, $R_2$ and $R_3$ of formula I and II are each hydrogen.

24. A synthetic polymer according to claim 1, wherein a compound of formula I is employed as reactant (d).

25. A synthetic polymer according to claim 4 wherein $q$ is a number between 0.191 and 10.74.

26. A synthetic polymer according to claim 25 wherein $q$ is a number between 0.357 and 10.74.

27. A synthetic polymer according to claim 26 wherein $q$ is a number between 0.535 and 8.58.

28. A synthetic polymer according to claim 1 wherein reactant (a) is an oxidized polyethylene having a molecular weight of between 1500 and 4000 and an acid value of between 15 and 80 and reactant (d) is a compound of formula I.

* * * * *